United States Patent [19]

Kitaoka et al.

[11] Patent Number: 4,678,063
[45] Date of Patent: Jul. 7, 1987

[54] APPARATUS FOR CONTROLLING AN ELEVATOR

[75] Inventors: Takashi Kitaoka; Eiki Watanabe, both of Inazawa, Japan

[73] Assignee: Mitsubishi Denki Kabushiki Kaisha, Tokyo, Japan

[21] Appl. No.: 778,042

[22] Filed: Sep. 20, 1985

[30] Foreign Application Priority Data

Oct. 5, 1984 [JP] Japan .................... 59-209406

[51] Int. Cl.$^4$ .............................................. B66B 1/30
[52] U.S. Cl. ................................................. 187/119
[58] Field of Search ................ 187/29 R; 318/34, 37, 318/370

[56] References Cited

U.S. PATENT DOCUMENTS 3,593,089 7/1971 Appelo .................................. 318/370
4,216,420 8/1980 Jinbo et al. ......................... 318/370
4,503,940 3/1985 Watanabe .......................... 187/29 R

FOREIGN PATENT DOCUMENTS 154380 9/1983 Japan .
163276 9/1984 Japan .
2111251A 6/1983 United Kingdom .

Primary Examiner—William M. Shoop, Jr.
Assistant Examiner—Richard K. Blum
Attorney, Agent, or Firm—Sughrue, Mion, Zinn, Macpeak, and Seas

[57] ABSTRACT

An elevator control system connected to a source of three-phase alternating current which is rectified by a converter to direct current which is converted to a variable-voltage variable-frequency A.C. voltage which, in turn, drives the elevator hoist motor. A resistor and a switch are connected across the D.C. terminals of the converter. When the motor is operating in the regenerative mode, the switch is closed to permit the regenerated circuit to flow through the resistor which dissipates or consumes the regenerated power. When the regenerated power being consumed by the resistor is detected to exceed a predetermined value, the excess regenerated power is returned to the A.C. source through a regenerative inverter.

5 Claims, 5 Drawing Figures

APPARATUS FOR CONTROLLING AN ELEVATOR

BACKGROUND OF THE INVENTION

The present invention relates to an elevator controlling apparatus which employs variable-voltage and variable-frequency control (referred to as "VVVF control", hereinafter) and, more particularly, to the handling of electric power regenerated by the elevator hoist motor.

FIG. 4 shows a known apparatus for controlling an elevator.

Referring to FIG. 4, a converter 1 is constituted by a diode rectifier which converts the alternating current from three-phase AC mains R, S, T into a direct current. A smoothing capacitor 2 is connected to the DC side of the converter 1. A known PWM type inverter 3 is also connected to the DC side of the converter 1. The inverter 3 is constituted by a transistor 3a and a diode 3b in this example such as to convert a constant DC voltage into a VVVF AC voltage by pulse-width control. A three-phase induction hoist motor 4 is connected to the inverter 3. A hoist 5 is connected to the motor 4 through a shaft 4a. A brake 6 is adapted to brake the hoist 5. A main rope 7 is passed over the hoist 5. A cage 8 and a counterweight 9 are respectively connected to opposite ends of the main rope 7. The reference numerals 10 and 11 respectively denote a speedometer and a current transformer which detects the current flowing through the motor 4. A controller 12, to which signals from the speedometer 10 and the current transformer 11 are input, controls the voltage and frequency of the output of the inverter 3. A resistor 13 is provided to consume electric power which is regenerated by the motor 4, while a series-connected switching transistor 14 controls the on/off operation of the resistor 13 by either blocking or permitting current flow therethrough. A regenerated power-detecting means in the form of a voltage detector 15 is adapted to detect the voltage across the smoothing capacitor 2 via leads or probes 15a. The means 15 is actuated when the voltage across the smoothing capacitor 2 exceeds a predetermined value such as to make the transistor 14 conductive, thereby turning on resistor 13. The regenerated power detecting means 15 has heretofore been constituted by an overvoltage detector which is actuated whenever electric power is regenerated. (An apparatus similar to the above-described one has been shown in the specification of Japanese Patent Laid-Open No. 163276/1984).

The operation of the elevator controlling apparatus shown in FIG. 4 will now be described.

Whether an elevator is operating in a powered-running state or in a regenerative-running state is decided by the relationship between the weight of the cage 8 including passengers, and that of the counterweight 9 and by the running direction. More specifically, when the cage 8 is raised while bearing a load which corresponds to its fixed capacity, the motor 4 is in the powered-running state. In such as case, the motor 4 is supplied with electric power from the converter 1, and there is no possibility of the overvoltage detector 15 being actuated. On the other hand, when the cage 8 is lowered while bearing a load corresponding to its fixed capacity, the motor 4 is in the regenerative state.

Since the converter 1 is constituted by a diode rectifier, it is not possible to return the regenerated power to the power source R, S, T. For this reason, when electric power is regenerated, the voltage across the smoothing capacitor 2 rises and actuates the overvoltage detector 15 such as to make the transistor 14 conductive. When transistor 14 is conductive, current flows through the resistor 13 which dissipates or consumes the regenerated power. Since the regenerated power is thus consumed or absorbed, cage 8 is run at a predetermined speed without any fear of its being lowered at an excessive speed.

However, the resistor 13 is generally installed in a machine room (not shown) where the motor 4 and other devices may be housed. As a consequence, the heat generated from the resistor 13 undesirably raises the temperature of the machine room. When the capacity of the motor 4 is relatively small, this heat problem is not extremely serious. However, as the speed or carrying capacity of the cage 8 increases, the capacity of the motor 4 must be increased. As the rated load or capacity of the motor 4 is increased, the power regenerated thereby also increases, and the generation of heat in the machine room also increases.

Consequently, the air-cooling capacity required to cool the machine room also undesirably increases, which fact disadvantageously involves an increase in the consumption of energy in the building as a whole.

Another known elevator controlling apparatus is shown in FIG. 5.

In FIG. 5, the same members or portions as those in FIG. 4 are denoted by the same reference numerals. A converter 20 is constituted by a thyristor rectifier. The converter 20 is fired by a firing circuit 20a. A regenerative inverter 21, which is adapted to return the regenerated power to the power source R, S, T, is constituted by six thyristors 21t. A firing circuit 21a is adapted to fire the regenerative inverter 21. A reactor 22 is connected to the DC side of the regenerative inverter 21. The reactor 22 is employed to protect the regenerative inverter 21 when the converter 20 becomes inoperative as a result of an undesirable stoppage of current from the power source R, S, T. An autotransformer 23 is provided to make reliable the commutation of the regenerative inverter 21. The voltage of the autotransformer 23 on its regenerative inverter 21 side is slightly higher than the voltage of the power source R, S, T.

In the elevator controlling apparatus shown in FIG. 5, the overvoltage detector 15 also is not actuated when the motor 4 is in a powered-running state, in a manner similar to that of the apparatus shown in FIG. 4. As a consequence, the firing circuit 20a actuates the converter 20 such as to supply electric power. On the other hand, when the motor 4 is in a regenerative state, the overvoltage detector 15 is actuated such as to make the firing curcuit 20a inoperative and to cause the firing circuit 21a to fire the regenerative inverter 21. This firing allows the regenerated power to be returned to the power source R, S, T via the regenerative inverter 21 and the autotransformer 23.

In the elevator controlling apparatus shown in FIG. 5, the thyristors 21t are required to possess a capacity large enough to return the regenerated power to the power source R, S, T, which fact disadvantageously involves an increase in cost.

Another known regenerated power handling apparatus has been disclosed in the specification of Japanese Patent Laid-Open No. 154380/1983 (U.S. patent application Ser. No. 470,955, filed Mar. 1, 1983). This regenerated power handling apparatus is arranged such that, in a first stage of regeneration of power, the regenerated power is employed as a power source for various controllers of the elevator, and as the regenerated power further increases in amount, it is also consumed by a resistor, thereby eliminating any need to provide an inverter for regeneration of electric power.

In practice, however, there are cases where it is not possible to use the above-described arrangement wherein no power regeneration inverter is employed. Therefore, it is not always possible to say that such an arrangement is adequate for practical use.

Further, utilization of regenerated power at a power failure is disclosed in the specification of U.K. Patent Application Publication No. GB No. 2,111,251A (U.S. patent application Ser. No. 440,350, filed Nov. 9, 1982). According to the disclosure, at the time of a power failure various control circuits for an elevator are driven by the use of regenerated power such that the elevator is stopped at the nearest floor.

In an apparatus having the above-described arrangement, however, the regenerated power in a normal operation is handled in a regenerative inverter and returned to a power source. In a consequence, this apparatus also disadvantageously requires a regenerative inverter which is high in cost, such as that described in relation to FIG. 5.

U.S. Pat. No. 4,503,940, assigned to the assignee of this application, disclosed a VVVF elevator control system in which the regenerated power is normally returned to the A.C. mains through a regenerative inverter. However, when an emergency generator becomes the A.C. source upon failure of the main A.C. source, the regenerative inverter is blocked and the regenerated power is absorbed or consumed by a resistor.

As will be understood from the above description, known elevator controlling apparatuses have suffered various problems, that is, an excessive rise in the temperature in the machine room in the case where regenerated power is consumed in a resistor, and an increase in the cost because of the regenerative inverter in the case where the regenerated power is return to the power source.

SUMMARY OF THE INVENTION

In view of the above-described problems of the prior art, it is a primary object of the present invention to allow regenerated power to be handled with a low-cost apparatus by providing an arrangement wherein a part of the regenerated power is consumed in the machine room and the rest is returned to the power source.

To this end, the present invention provides, in an elevator controlling apparatus in which an alternating current is converted into a direct current which is further converted into a VVVF alternating current for controlling the hoist of an elevator, an improvement characterized by comprising: a resistor connected to the DC circuit such as to consume any electric power regenerated by a hoist motor; and a regenerative inverter adapted to return excess regenerated power to the power source when the amount of the regenerated power being consumed by the resistor exceeds a predetermined value.

Thus, in the elevator controlling apparatus according to the present invention, any regenerated power less than the predetermined value is consumed by the resistor, and any regenerated power which exceeds the predetermined value is returned to the power source by the regenerative inverter.

BRIEF DESCRIPTION OF THE DRAWING

FIGS. 1 to 3 in combination show one embodiment of the present invention, in which:

FIG. 1 is a block diagram of the embodiment;

FIG. 2 shows the circuit configuration of the embodiment; and

FIG. 3 is a flow chart of a program employed in the embodiment; and

DESCRIPTION OF THE PREFERRED EMBODIMENT

Figure 1:
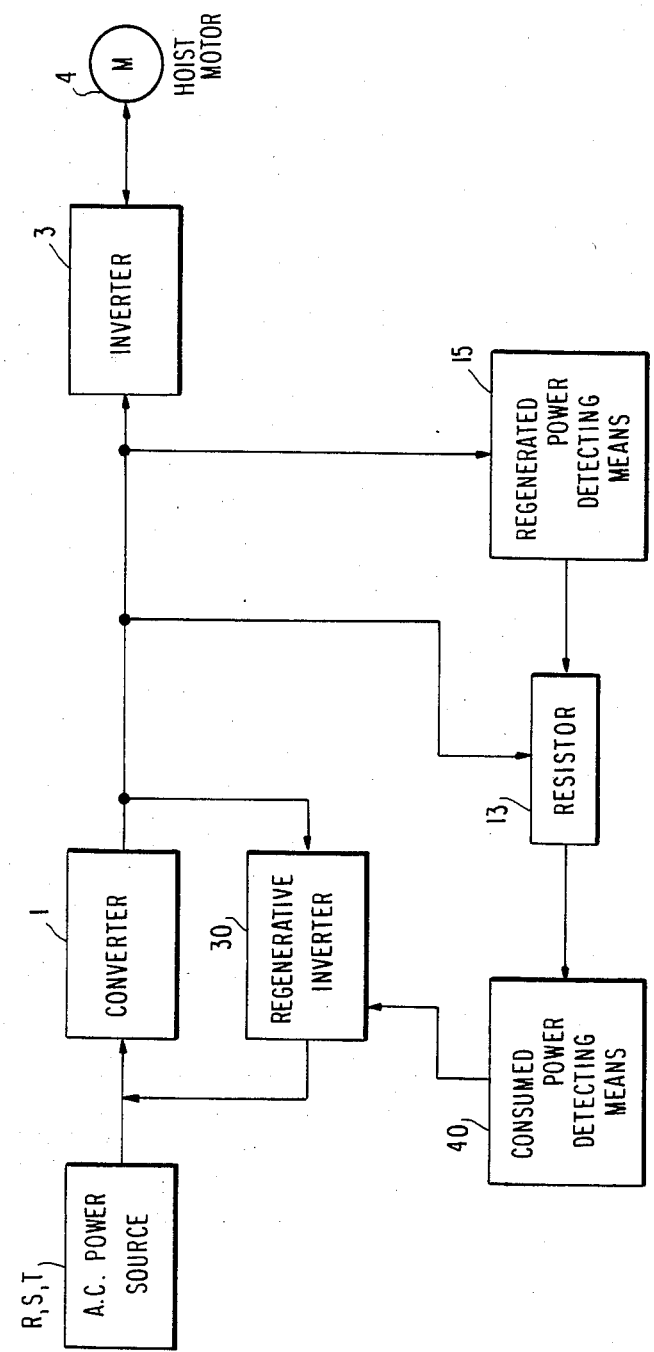

FIG. 1 shows the arrangement of the whole of one embodiment of the elevator controlling apparatus according to the present invention. As will be clear from FIG. 1, this embodiment is arranged as follows. The alternating current supplied from the AC power source R, S, T is converted into a direct current by the converter 1, and this direct current is further converted into an alternating current by the inverter 3 so as to be employed to control the hoist motor 4. In this elevator controlling apparatus, when the regenerated power detecting means 15 detects the fact that the hoist motor 4 is regenerating electric power, the regenerated power is supplied to the resistor 13 and consumed thereby; when the amount of the power thus consumed exceeds a predetermined value, a consumed power detecting means 40 is actuated such as to cause a regenerative inverter 30 to return the regenerated power to the AC power source R, S, T.

Figure 2:
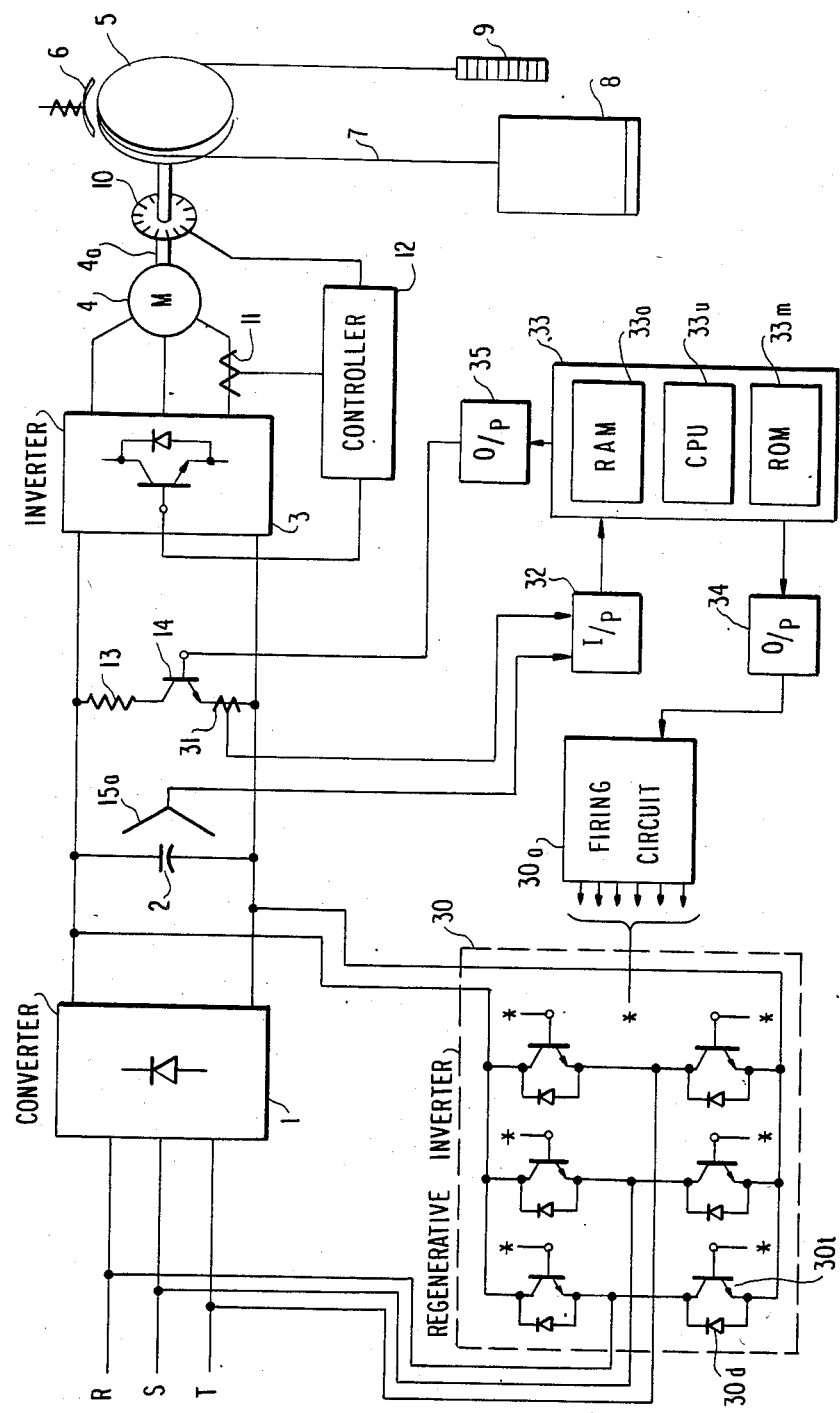
Figure 3:
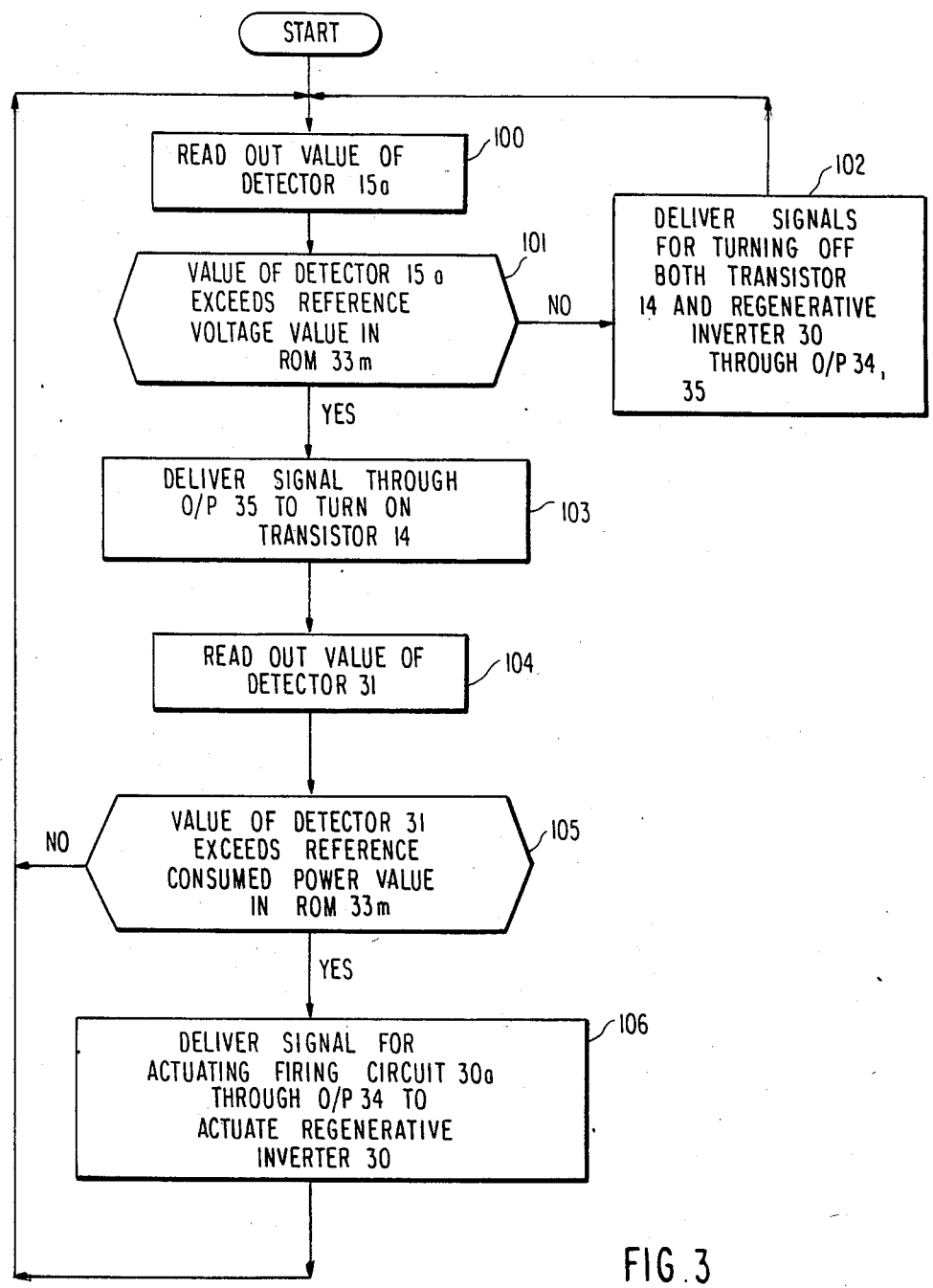

FIG. 2 is a circuit configuration of the embodiment of the elevator controlling apparatus shown in FIG. 1, while FIG. 3 is a flow chart of a program employed in the embodiment.

Figure 4:
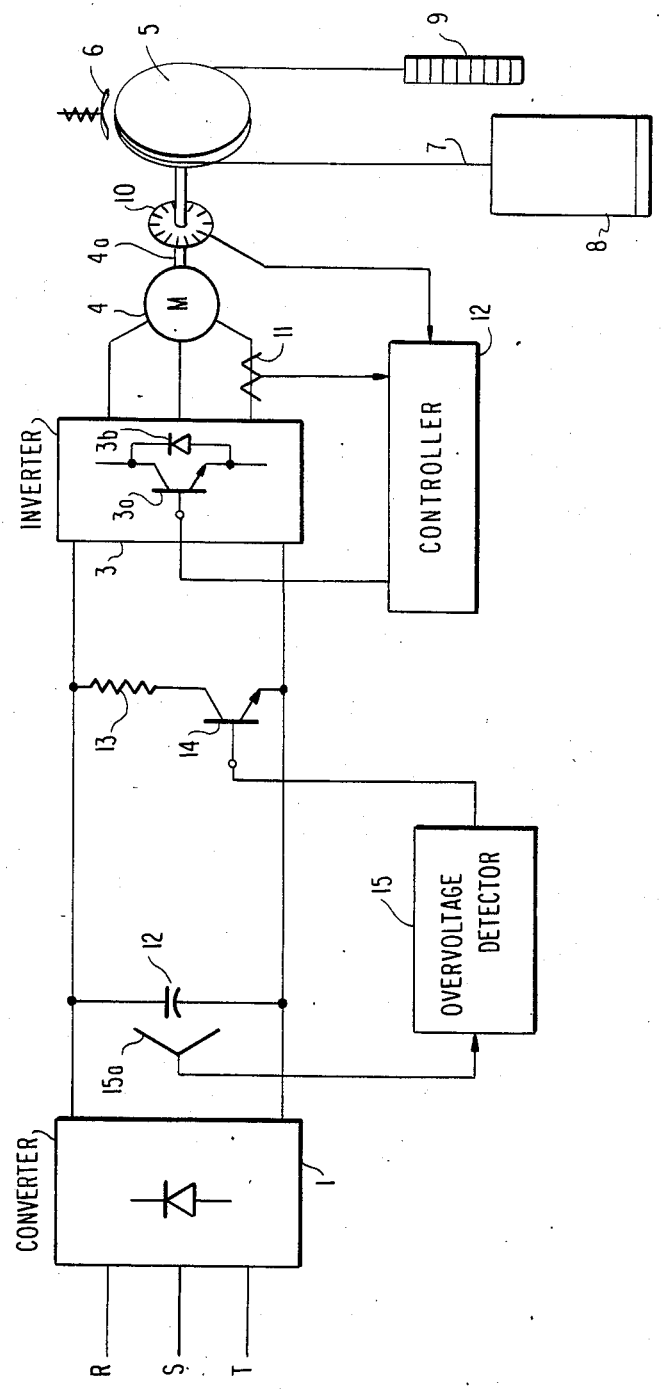
FIGS. 4 and 5 are circuit configurations of known elevator controlling apparatuses, respectively.
Figure 5:
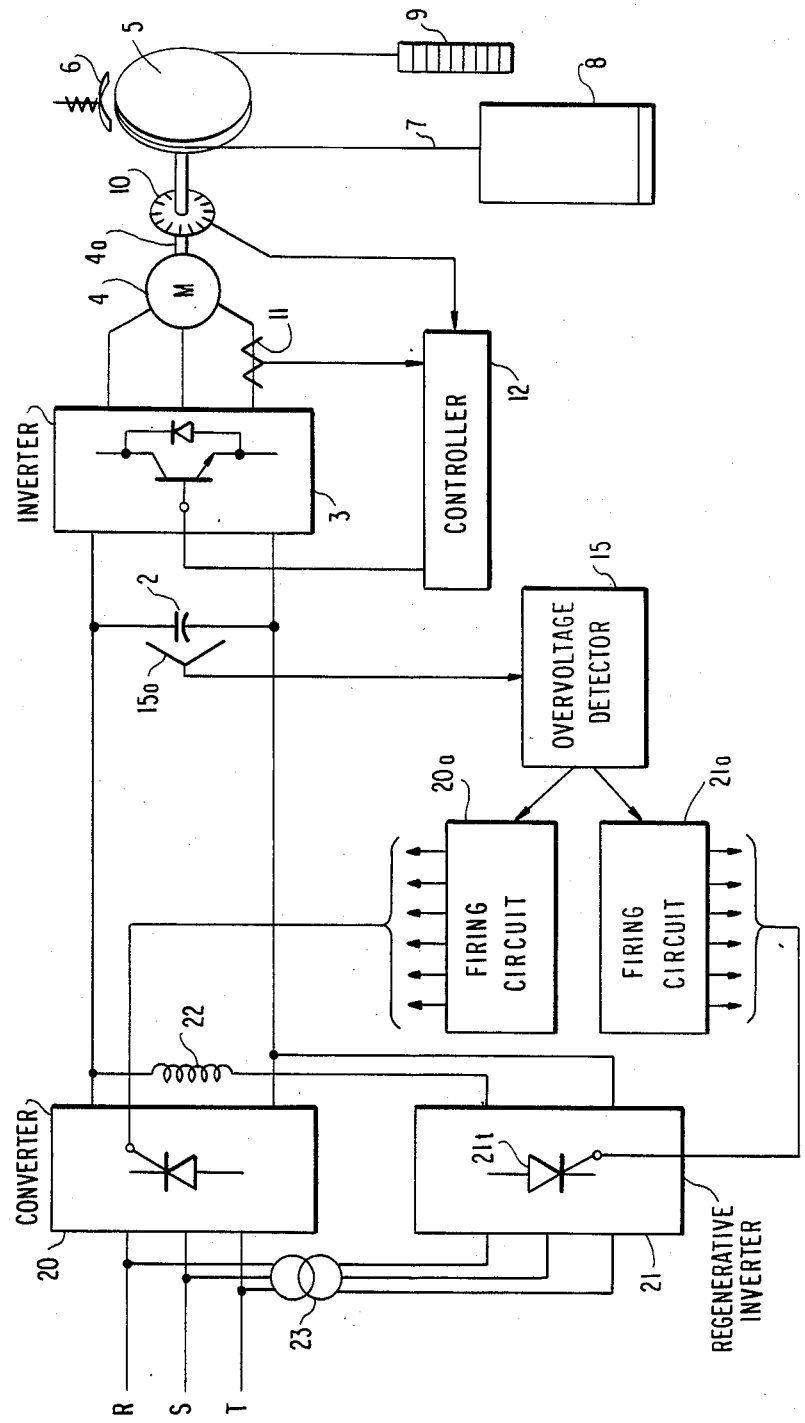

Referring first to FIG. 2, the same reference numerals as those in FIGS. 4 and 5 denote the same or corresponding members or portions. The regenerative inverter 30 is formed in a three-phase bridge by employing six pairs of transistors 30t and diodes 30d, each transistor and its associated diode being connected in parallel such as to be opposite to each other in polarity. A firing circuit 30a is adapted to fire the regenerative inverter 30. A detector 31 detects the current flowing through the resistor 13. An input port 32 (referred to as an "I/P", hereinafter) is adapted to convert a signal from the detector 31 and a signal representing the voltage across the smoothing capacitor 2 into respective digital signals. A microcomputer 33 processes signals from the I/P 32. The microcomputer 33 is composed of: a central processing unit 33u (referred to as a CPU, hereinafter); a random-access memory 33a (referred to as a RAM, hereinafter) for storing external data and results of calculation; and a read-only memory 33m (referred to as a ROM, hereinafter) in which the program shown in FIG. 3 and various reference values have been stored. An output port 34 (referred to as an O/P, hereinafter) is adapted to actuate the firing circuit 30a in accordance with the result of calculation carried out by the microcomputer 33. In addition, an O/P 35 is adapted to run on, or render conductive, the transistor 14, and operates in a manner similar to that of the O/P 34.

The operation of this embodiment will now be described with reference to FIG. 3.

(1) Powered-Running Operation:

When the cage 8 is raised while bearing a load corresponding to its fixed capacity, the motor 4 is supplied with electric power from the AC power source R, S, T such as to perform a powered running operation. In this state, the value detected by the detector 15a is read out in a process step 100 shown in FIG. 3, and a comparison is made in a step 101 between the value read out and a reference voltage value previously stored in the ROM 33m. In such a powered running operation, there is no possibility of the value read out from the detector exceeding the reference voltage value. Therefore, the answer of the judgment made in the step 101 is "NO", and the process proceeds to a step 102. In the step 102, such signals are delivered as making both the transistor 14 and the regenerative inverter 30 nonconductive, and the process then returns to the step 100. As a consequence, the electric power is neither consumed by the resistor 13 nor returned to the AC power source R, S, T.

(2) Regenerative-Running Operation:

When the cage 8 is raised while empty, for example, the motor is the regenerative running state (because of the effect of the counterweight). More specifically, in such a case, the value detected by the voltage detector 15a exceeds the reference voltage value. As a consequence, the answer of the judgment made in the step 101 becomes "YES", and the process proceeds to a step 103, in which the transistor 14 is made conductive through the O/P 35. The transistor 14 being conductive allows the regenerated power to be consumed or dissipated by the resistor 13. The value detected by the detector 31 is read out in a step 104. Further, a comparison is made in a step 105 between the value read out and a reference consumed power value previously stored in the ROM 33m. If the read-out value is not in excess of the reference consumed power value, the answer of the judgment is "NO", and the process returns to the step 100. If the reference consumed power value is exceeded, the answer is "YES", and the process proceeds to a step 106. In the step 106, a signal is delivered through the O/P 34 such that the firing circuit 30a is actuated to cause the regenerative inverter 30 to return the regenerated power to the power source R, S, T.

According to the above-described embodiment, since a part of the regenerated power is consumed by the resistor 13, the amount of regenerated power which is returned to the power source R, S, T is reduced correspondingly. This reduction in the amount of the regenerated power advantageously decreases the required capacity of a transformer (not shown) employed to constitute the power source R, S, T. When the power source R, S, T is supplied by a non-utility power generator in particular, such as an emergency engine-generator, it is frequently necessary for substantially all of the regenerated power to be dissipated or consumed as a generator loss, since such a generator generally involves a small loss and has a small load connected thereto. For this reason, the rated capacity of the generator is determined so that the generator is able to absorb the regenerated power, which fact conventionally requires a generator which has an otherwise unnecessarily large capacity. According to the present invention, however, the regenerated power is consumed by the resistor 13; therefore, it is possible to reduce the required capacity of the generator and, consequently, to lower the cost.

Further, since the amount of the regenerated power which is to be converted by the regenerative inverter 30 is reduced by an amount corresponding to that which is consumed by the resistor 13, the required capacities of the transistors 30t and the diodes 30d are also favorably reduced. Also, since six pairs of transistors 30t and diodes 30d are employed to constitute the regenerative inverter 30, the capacities of all the transistors and diodes for six pairs are reduced, so that the degree of reduction in the cost of these components is favorably larger than the increase in the cost caused by the employment of the resistor 13 and other members.

Furthermore, since the elevator controlling apparatus shown in FIG. 2 employs the transistors 30t, the apparatus is advantageously made free from any irregularity in the voltage waveform (the phenomenon in which notches are formed in the waveform), whereas the conventional apparatus (shown in FIG. 5) which employs the thyristors 21t undesirably involves such irregularity.

As has been described above, according to the present invention, in an elevator controlling apparatus in which an alternating current is converted into a direct current which is further converted into a VVVF alternating current for controlling the hoist motor of the elevator, a resistor is connected to the DC circuit such that, when the hoist motor regenerates electric power, it is consumed by this resistor, and when the amount of the regenerated power being consumed by the resistor exceeds a predetermined value, a regenerative inverter is actuated such as to return the regenerated power to the power source. Therefore, the generation of heat by the resistor is advantageously suppressed, and it is consequently possible to prevent any abnormal rise in the temperature in the machine room. Additionally, it is possible to reduce the required capacity of the regenerative inverter by an amount corresponding to the amount of the regenerated power which is consumed by the resistor, so that it is favorably possible to lower the cost of the apparatus as a whole.

Random-access memory 33a may be an Intel 2148H, 1024×4 Bit Static RAM, read-only memory 33m an Intel 2708, 8K(1K×8) UV Erasable PROM, and central processing unit 33u an Intel 8086, 16 Bit HMOS Microprocessor. Because of the 16 Bit CPU 33u, four of the 2148H RAMs and two of the 2708 ROMs are needed.

I claim:

1. In an elevator controlling apparatus in which an alternating current supplied from a power source is converted into a direct current by a converter, and said direct current is further converted into a variable-voltage and variable-frequency alternating current for controlling a hoist motor, the improvement comprising:

regenerated power detecting means for producing a first signal when said hoist motor is regenerating electric power;

resistor means, connected to the direct current side of the converter, for consuming the regenerated power in response to said first signal;

consumed power detecting means, coupled to said resistor means, for detecting the amount of the regenerated power being consumed by said resistor means and for producing a second signal when said amount is in excess of a predetermined value; and regenerative inverter means, actuated in response to said second signal, for returning the excess regenerated power to said power source.

2. The improvement according to claim 1, further comprising processor means, coupled to both said regenerated power detecting means and said consumed power detecting means in such a manner as to be supplied with said first and second signals, said processor means functioning such that:
   (a) when it is supplied with said first signal, said processor means causes the regenerated power to be supplied to said resistor means so that said power is consumed by said resistor means; and
   (b) when said processor means is supplied with said second signal, said processor means actuates said regenerative inverter means to return the excess regenerated power to said power source.

3. An elevator controlling apparatus according to claim 2, wherein said inverter means has two D.C.-side terminals, and wherein said resistor means is connected between said D.C.-side terminals of said inverter means, and further comprising switching means, connected in series with said resistor means and coupled to said processor means, for being on/off-controlled by said processor means.

4. An elevator controlling apparatus according to claim 1, wherein said inverter means has two D.C.-side terminals, wherein said resistor means is connected between said D.C.-side terminals of said inverter means, and wherein said consumed power detecting means comprises current-detecting means for detecting the amount of power being consumed by said resistor means by detecting the current flowing through said resistor means.

5. An elevator controlling apparatus according to claim 1, wherein said power source is polyphase, and wherein said regenerative inverter means comprises a plurality of branch circuits which are connected in parallel, each of said branch circuits being formed by two series-connected members each of which is constituted by a diode and a transistor which are parallel-connected such as to be opposite to each other in polarity, the number of said branch circuits being equal to the number of phases of said power source.

* * * * *